Jan. 9, 1951  R. R. KLINGLER  2,537,411
WIPER FOR CURVED WINDSHIELDS
Filed July 2, 1945
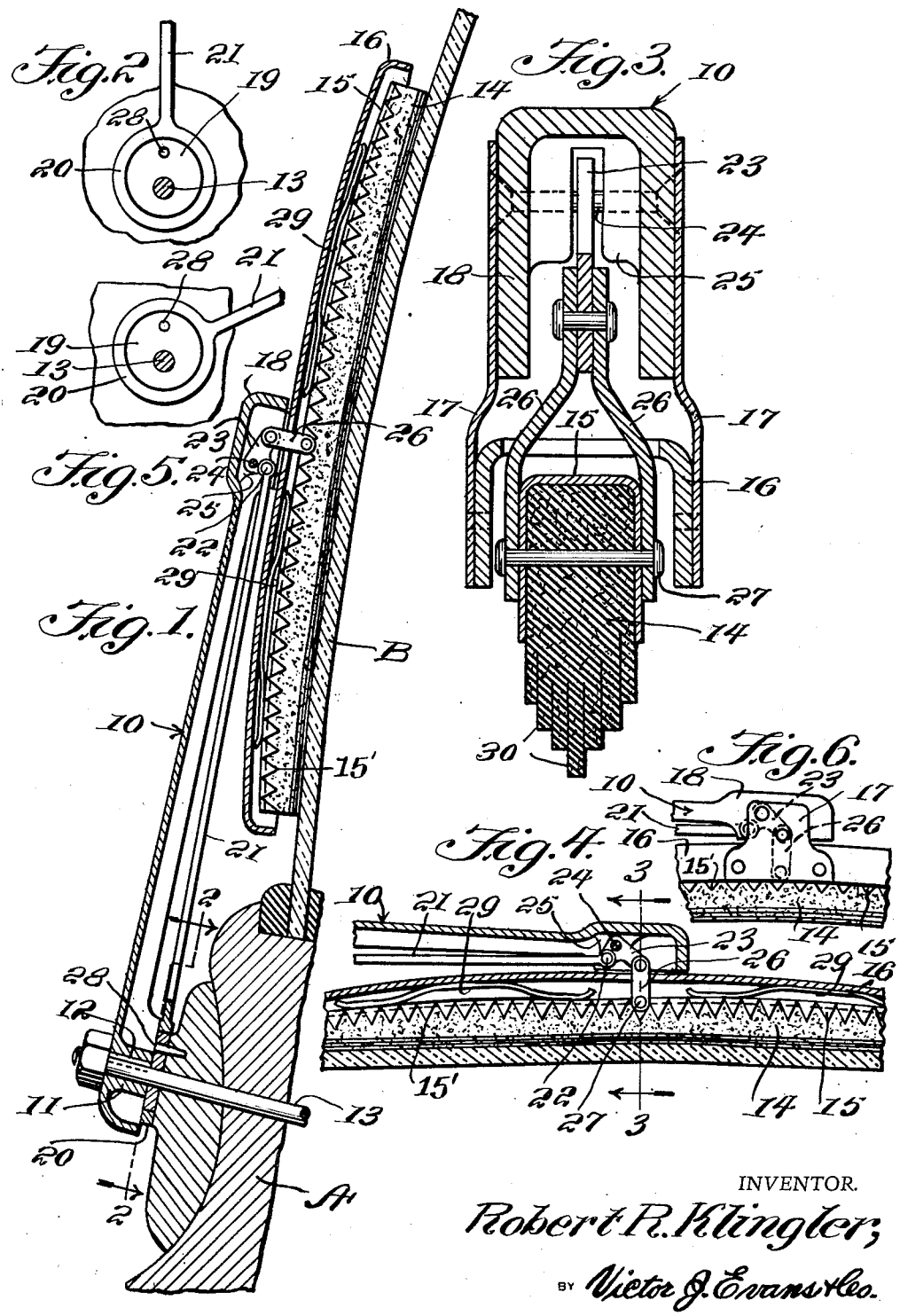
INVENTOR.
Robert R. Klingler,
BY Victor J. Evans & Co.
ATTORNEYS

Patented Jan. 9, 1951

2,537,411

UNITED STATES PATENT OFFICE 2,537,411

WIPER FOR CURVED WINDSHIELDS

Robert Raftrey Klingler, Bloomfield Hills, Mich.

Application July 2, 1945, Serial No. 602,770

2 Claims. (Cl. 15—255)

The invention relates to an automatically operated windshield wiper, and more especially to a wiper of a construction for cleaning curved glass windshields used in automobiles.

The primary object of the invention is the provision of a device of this character, wherein during the sweep of the wiper blade it will follow the surface of the glass of a windshield for positive contact therewith and follows the curvature of such glass for the cleaning thereof.

Another object of the invention is the provision of a device of this character, wherein the wiper blade is controlled through cam action cooperating with the sweep arm or throw lever, to have the said blade effect positive contact with the glass throughout a curved area of the same for the wiping operation thereon.

A further object of the invention is the provision of a device of this character, wherein the wiper blade is at all times under tension for the close contact of the same with the surface of the glass during the wiping of the same, the device being of novel construction and is unique in the working of the same, it being automatically actuated and is positive in the functioning thereof.

A still further object of the invention is the provision of a device of this character, which is simple in construction, thoroughly reliable and efficient in operation, strong, durable, compact in assembly, readily and easily repaired, the parts being freely accessible, neat in appearance, and inexpensive to manufacture and install.

With these and other objects in view, the invention consists in the features of construction, combination and arrangement of parts as will be hereinafter more fully described, illustrated in the accompanying drawing, which shows the preferred embodiment of the invention, and pointed out in the claims hereunto appended.

In the accompanying drawing:

Figure 1 is a fragmentary vertical sectional view through a curved windshield, showing the device constructed in accordance with the invention, and partly in section.

Figure 2 is a sectional view taken on the line 2—2 of Figure 1 looking in the direction of the arrows.

Figure 3 is an enlarged sectional view taken on the line 3—3 of Figure 4 looking in the direction of the arrows.

Figure 4 is an enlarged fragmentary sectional view similar to Figure 1 through the wiper head.

Figure 5 is a view similar to Figure 2 showing a change in position under cam action.

Figure 6 is a fragmentary side elevation.

Similar reference characters indicate corresponding parts throughout the several views in the drawing.

Referring to the drawing in detail, A designates generally a portion of the lower sill area of windshield framing installed in a motor vehicle or the like, and B a portion of an outwardly curved glass of such windshield, which latter in its entirety can be of any approved construction.

The windshield wiper device constructed in accordance with the invention, comprises swinging throw arm or the like 10, of channeled formation, having a hub 11 at one end portion, which is secured fast by a key 12 to the operating shaft 13, which is power driven for the oscillation of such arm or the like, in any approved manner or in the usual well known way.

Adapted to contact the convexed surface of the glass B is a wiper blade 14, preferably made from felt, rubber or other appropriate material, it being fitted in a rigid backing or holder 15, of the required length and width, and curved correspondingly to the convexed outer face of the glass B. The longitudinal edges of the holder 15 are serrated as at 15' whereby the holder 15 is crimped onto the wiper blade 14 to retain the blades in the holder. This holder 15 is displaceably housed within an elongated carrier head 16, provided midway of its length with mounting ears 17, which are fitted to the hollow terminal enlargement or end 18 on the arm or the like 10 opposite the end hub 11 thereof.

Eccentrically set about the shaft 13, next to the hub 11 is a cam disk 19, encircled by a cam strap or eye end 20 of an operating rod 21, which is connected by a pivot 22 to a bell-crank 23, swinging on a pivot 24 of a fixed bearing 25 formed within the terminal enlargement or end 18, the crank 23 being also pivotally connected to a link 26, which is coupled at 27 to the holder 15. Through the action of the cam disk 19 which is held in a fixed adjusted position by a fastener 28, the rod 21 will be operated to move the blade 14 outwardly of the head 16 to the proper extent for continuous contact with the glass B, following the curvature of the latter for positive wiping action of the wiper device.

The holder 15 is maintained under tension by leaf-like expansion springs 29 confined between the said holder and the head 16, as best seen in Figures 1 and 4 of the drawing.

The lever 21 is confined within the arm or the like 10 and receives cam action on the oscillation of the latter, which is driven from the shaft 13 in the operation of the windshield wiper device operation.

The wiper blade 14, preferably has the stepped glass contacting edge 30, yet it may be otherwise constructed, for the best flexible cleaning activity.

What is claimed is:

1. A wiper device of the kind described, comprising an elongated concaved shaped carrier head adapted to oscillate, an arm connected at one end portion thereof to said carrier head, a hub at the other end portion of said arm, means extending through said hub and keyed thereto for oscillating said arm with said last mentioned means, a wiper blade carried by the carrier head, and adapted for oscillating movement with said carrier head, cam means on said first means, an operating rod coacting with the first means and cam means for producing in and out movement of the wiper blade during the oscillation of the carrier head, a holder for said wiper blade, opposed links connected to said wiper blade on the opposite sides of said holder and a bell crank lever connecting said operating rod to said links.

2. A wiper device of the kind described, comprising an elongated concaved shaped carrier head adapted to oscillate, an arm connected at one end portion thereof to said carrier head, a hub at the other end portion of said arm, means extending through said hub and keyed thereto for oscillating said arm with said last mentioned means, a wiper blade carried by the carrier head and adapted for oscillating movement with said carrier head, cam means on said first means, an operating rod coacting with the first means and cam means for producing in and out movement of the wiper blade during the oscillation of the carrier head, a holder for said wiper blade, opposed links connected to said wiper blade on the opposite sides of said holder, a bell crank lever connecting said operating rod to said links and means for tensioning the wiper blade outwardly of the carrier head.

ROBERT RAFTREY KLINGLER.

REFERENCES CITED

The following references are of record in the file of this patent:

UNITED STATES PATENTS

| Number | Name | Date |
| --- | --- | --- |
| 1,692,036 | Hachenberg | Nov. 20, 1928 |
| 2,079,399 | Drew et al. | May 4, 1937 |
| 2,254,343 | Zierer | Sept. 2, 1941 |
| 2,326,231 | Kraemer | Aug. 10, 1943 |